United States Patent
Ben Hamida et al.

(10) Patent No.: US 8,892,031 B2
(45) Date of Patent: Nov. 18, 2014

(54) METHOD OF SECURING A WIRELESS COMMUNICATION, RECEIVER DEVICE AND COMMUNICATION SYSTEM IMPLEMENTING THIS METHOD

(75) Inventors: Sana Ben Hamida, Wimereux (FR);
Jean-Benoit Pierrot, Saint-Egreve (FR);
Olivier Savry, Sassenage (FR);
Pierre-Henri Thevenon, Bas-en-Basset (FR); Claude Castelluccia, Bernin (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 190 days.

(21) Appl. No.: 13/701,661

(22) PCT Filed: May 31, 2011

(86) PCT No.: PCT/FR2011/051252
§ 371 (c)(1),
(2), (4) Date: Dec. 3, 2012

(87) PCT Pub. No.: WO2011/157920
PCT Pub. Date: Dec. 22, 2011

(65) Prior Publication Data
US 2013/0078906 A1    Mar. 28, 2013

(30) Foreign Application Priority Data
Jun. 15, 2010 (FR) .................................. 10 54723

(51) Int. Cl.
*H04B 7/185* (2006.01)
*H04W 12/12* (2009.01)
(Continued)

(52) U.S. Cl.
CPC .............. *H04B 17/02* (2013.01); *H04W 12/12* (2013.01); *H04K 3/22* (2013.01);
(Continued)

(58) Field of Classification Search
USPC .................. 455/11.1, 12.1, 13.1, 63.1, 67.11, 455/67.13, 500, 501
See application file for complete search history.

(56) References Cited

U.S. PATENT DOCUMENTS 7,043,208 B2 * 5/2006 Nigra ............................... 455/78
8,023,955 B2 * 9/2011 Anderson ...................... 455/450
(Continued)

FOREIGN PATENT DOCUMENTS

WO    2009 033001    3/2009

OTHER PUBLICATIONS

International Search Report Issued Aug. 4, 2011 in PCT/FR11/51252 Filed May 31, 2011.

*Primary Examiner* — Nhan Le
(74) *Attorney, Agent, or Firm* — Oblon, Spivak, McClelland, Maier & Neustadt, L.L.P.

(57) ABSTRACT

A method for securing a wireless communication between a transmitter and a receiver includes: reception of a signal by the receiver; extraction by the receiver of at least one noise parameter of this signal received; comparison of the extracted noise parameter with at least one corresponding reference noise parameter stored in a memory in the receiver; decision on the presence or absence of a relay device between the transmitter and the receiver according to the result of this comparison; a preliminary calibration of the receiver, wherein: the receiver receives a signal resulting from a direct communication with the transmitter without intervention of a relay device, the receiver extracts at least one noise parameter from the signal received, and the receiver stores this noise parameter in the memory as a reference noise parameter characteristic of a direct communication without a relay device between the transmitter and the receiver.

9 Claims, 4 Drawing Sheets

Figure 1A:
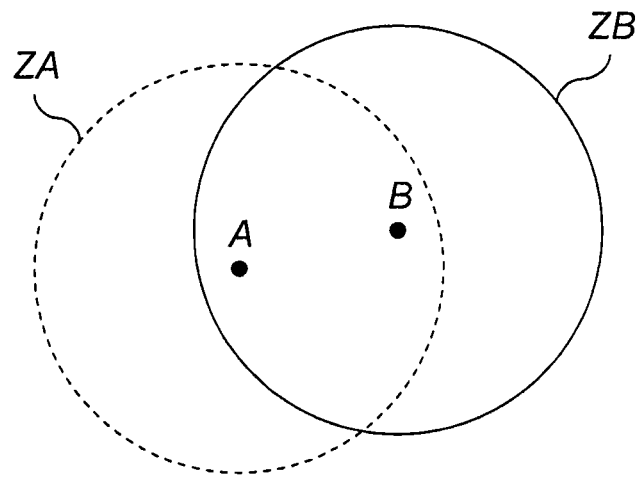

(51) Int. Cl.
*H04K 3/00* (2006.01)
*H04B 17/02* (2006.01)
*H04L 29/06* (2006.01)
*H04B 17/00* (2006.01)
*G07C 9/00* (2006.01)

(52) U.S. Cl.
CPC .. *G07C 2009/00555* (2013.01); *H04L 63/1466* (2013.01); *H04K 3/60* (2013.01); *H04K 3/46* (2013.01); *H04B 17/0062* (2013.01); *H04B 17/0055* (2013.01)

USPC .................. 455/13.1; 455/67.13; 455/501

(56) References Cited

U.S. PATENT DOCUMENTS

| | | | |
|---|---|---|---|
| 8,095,067 B2 * | 1/2012 | Gainey et al. ................ | 455/22 |
| 8,340,686 B2 * | 12/2012 | Bartlett ..................... | 455/456.1 |
| 2006/0255909 A1 | 11/2006 | Pavatich et al. | |
| 2010/0207732 A1 | 8/2010 | Patwari et al. | |

* cited by examiner

METHOD OF SECURING A WIRELESS COMMUNICATION, RECEIVER DEVICE AND COMMUNICATION SYSTEM IMPLEMENTING THIS METHOD

This invention relates to a method for securing a wireless communication. It also relates to a receiver device and a secured communication system implementing this method.

By "wireless communication", we mean a communication between a transmitter A and a receiver B established without the use of any physical link between A and B, whether this physical link is an electrical wire or cable for the transmission of an electrical current, an optical fibre for the transmission of optical signals, or any physical waveguide capable of guiding electromagnetic or acoustic waves.

According to this definition, communications generally qualified as being "contactless", i.e. without electrical contact, of the RFID, NFC or other types, belong to the family of wireless communications.

The implementation of the invention can therefore be envisaged in traditional wireless telecommunication networks (for example, communication between a mobile terminal and a relay antenna), ad hoc-type wireless networks (for example, spontaneous communication between two mobiles), sensor networks (for example, wireless transmission of information generated by a sensor to another point of the network), contactless systems (for example, near or far field RFID systems, NFC systems, or the like), vehicular networks (for example, contactless communication for remotely controlling the opening of a car) or any other wireless communication application.

It is also considered that, during a wireless communication between a transmitter A and a receiver B, a signal received by B may, according to the application, result:

1—from a signal generated and transmitted by A (traditional wireless communication between A and B, for example),
2—a wave transmitted by B and reflected by A (near or far field RFID-type communication, for example), or
3—an inductive coupling between A and B, for example if A is placed in the vicinity of B generating an electromagnetic field (near field contactless communication, for example).

The signal transmitted by the transmitter A is therefore, depending on the case, a signal generated by A (case 1), a signal reflected by A (case 2) or an "induced" signal corresponding to the influence of A on the magnetic field seen by the receiver B (case 3).

This type of communication has become very widespread, but is particularly vulnerable to attacks, in particular relay attacks also qualified in certain cases of attacks as "wormhole attacks". Indeed, the data routed in the wireless communication systems may be threatened by malicious interceptions intended to throw the normal functioning of the communication out of balance. These attacks are easy to perform but difficult to counter, upsetting the confidence of users in this type of communication.

The relay attack consists more specifically of producing, by means of at least one relay device that is in principle unauthorized, a wireless connection between a transmitter and a receiver so that they communicate even if they are not within the communication range of one another. Its objective is to succeed in obtaining authorizations for access to applications by creating a tunnel between the transmitter and the receiver, this tunnel intercepting the flow of generally confidential data exchanged in the form of signals travelling freely in the air or in the form of controlled variations of an electromagnetic field between the transmitter and the receiver. In ad hoc networks, the creation of this pirate tunnel between the transmitter and the receiver also generates false information concerning the routing table of the communication in progress, the location, the consensus algorithms, and so on.

The relay attack is already potentially dangerous, but it is also capable of introducing other more sophisticated attacks such as the "man in the middle" attack, the "denial of service" attack or the "replay" attack.

Numerous solutions for providing security have been imagined in order to counter this attack, but they are always too complex and/or too specific to certain applications and/or unsatisfactory in terms of efficacy.

For example, in the cooperative network applications such as the ad hoc networks and the sensor networks, the following approaches may be proposed:

the measurement of a delay time according to the time of transmission and the time of reception (including the processing time) of data packets, but this complex solution requires the use of synchronized clocks between the transmitter and the receiver in order to reduce the decision errors, the verification of the geographic position of the transmitter device in order to determine if it is actually within the communication range of the receiver device, but this equally complex solution requires the use of a positioning system such as a GPS (Global Position System), the estimation of a time of flight by a measurement of the time, by the transmitter device, between the sending of a message and the reception of its acknowledgement when the communication protocol provides it, but this imprecise solution does not take into account the processing time of the message by the receiver before the sending of the acknowledgement even though this processing time is far from being negligible, the estimation of the distance separating the transmitter from the receiver by measuring the power of the signal received, but this solution can be envisaged only for static transceiver networks, the use of directional antennas, but this solution which is very specific to certain applications adds a certain structural complexity, other even more specific solutions requiring a communication environment between static devices.

As another example, in contactless communication applications of the RFID card and sensor type, other approaches may be proposed in addition to those above:

the locating of the RFID card by using UWB technology that makes it possible to measure distances with a resolution below 30 cm, but this solution adds a notable cost and complexity for a degree of precision that has yet to be demonstrated, the temporary deactivation of the RFID card by the carrier by means of Faraday cage devices or means for separating the chip and the antenna of the card, but these solutions add complexity and require intervention by the user.

Other solutions have also been proposed, often for very specific applications, such as, for example, that described in the international patent application published under number WO 2004/114227. In this document, a technically simple solution is imagined, using the generation and use, in the process of communication between the transmitter and the receiver, of a sound signal audible to a user. But, again, the field of applications that can be envisaged is very narrow, for example, remotely controlling the opening of a car, not to mention that this solution also requires action by the user.

The patent application published under number US 2006/0255909 A1 describes a method for securing a wireless communication between a transmitter device and a receiver device, comprising the reception of a signal by the receiver device. This signal is, for example, a message comprising authentication data or a "natural" HF noise of which the receiver regularly monitors the level. A noise test is performed by the receiver. This test is intended to detect interferences or changes in the HF noise of the natural environment of the receiver. It is based on a comparison of at least one noise parameter extracted from the signal received with a reference noise parameter characteristic of a reference HF noise of the natural signal.

It may be desired to provide a security method that makes it possible to overcome at least some of the aforementioned problems and constraints.

The invention therefore relates to a method for securing a wireless communication between a transmitter device and a receiver device, comprising the following steps:
  reception of a signal by the receiver device,
  extraction by the receiver device of at least one noise parameter of this signal received,
  comparison of the extracted noise parameter with at least one corresponding reference noise parameter stored in the memory in the receiver device,
  decision on the presence or the absence of a relay device between the transmitter device and the receiver device according to the result of this comparison.

Advantageously, a method for securing a wireless communication according to the invention further comprises a preliminary calibration of the receiver device, wherein:
  the receiver device receives a signal resulting from a direct communication with the transmitter device without the intervention of a relay device,
  the receiver device extracts at least one noise parameter from the signal received, and
  the receiver device stores this noise parameter in the memory as a reference noise parameter characteristic of a direct communication without a relay device between the transmitter device and the receiver device.

It is indeed shown that the intervention of at least one relay device in a wireless communication has an effect on the noise of the signal received by the receiver device, in particular when the relay device merely intercepts and retransmits a signal with or without amplification. Thus, since it is simple for the receiver to extract noise parameters from the signal received, in particular in a preliminary calibration step, it is prudent to use these parameters for the detection of one or more unauthorized relay devices. Moreover, this solution is transparent for the user. It will finally be noted that it offers the possibility of detecting a relay attack by being based on characteristics of the physical layer (in the sense of layers of the international Open Systems Interconnection OSI model) that are the noise parameters estimated at the receiver.

Optionally, a method for securing a wireless communication according to the invention may first comprise the following steps:
  generation, by the transmitter device, of a predetermined noise based on at least one predetermined noise parameter known to the transmitter device and the receiver device, and
  transmission of a signal comprising the predetermined noise, and the comparison, by the receiver device, of the extracted noise parameter with the reference noise parameter may comprise the consideration of the predetermined noise parameter known to the transmitter device and the receiver device.

Also optionally, the extracted noise parameter and the reference noise parameter each comprise a noise variance estimation parameter.

Also optionally, the decision about the presence or the absence of a relay device comprises a test step based on the test of a hypothesis of the presence or absence of a relay device checked against the rejection thresholds of this hypothesis computed according to the Fisher test or predetermined probabilities of the false positives and/or negatives targeted.

The invention also relates to a device for receiving signals generated by a wireless communication between a predetermined transmitter device and this receiver device, comprising:
  means for calibration by reception of a signal resulting from a direct communication with the transmitter device without the intervention of a relay device and by extraction of at least one noise parameter from the signal received as a reference noise parameter characteristic of a direct communication without a relay device between the transmitter device and the receiver device,
  means for storing this reference noise parameter,
  means for extracting at least one noise parameter from a signal received,
  means for comparing the extracted noise parameter with the reference noise parameter,
  means for detecting the presence or the absence of a relay device between the predetermined transmitter device and the receiver device according to the result of this comparison.

Optionally, a receiver device according to the invention may further comprise means for storing at least one predetermined noise parameter also known to the predetermined transmitter device and the comparison means may be designed to take this predetermined noise parameter into account.

Also optionally, the extraction means comprise:
  a band-stop filter intended to be applied to the signal received in order to provide a filtered noise signal and of which the cut-off frequencies are defined according to an assumed useful bandwidth of the signal received, and
  means for estimating at least one statistical, spectral and/or amplitude parameter of the filtered noise signal.

The invention also relates to a secure wireless communication system comprising at least one receiver device and at least one transmitter device, wherein each receiver device is a device as defined above.

Optionally, each transmitter device or receiver device, respectively, is also a receiver device or a transmitter device, respectively.

Figure 1B:
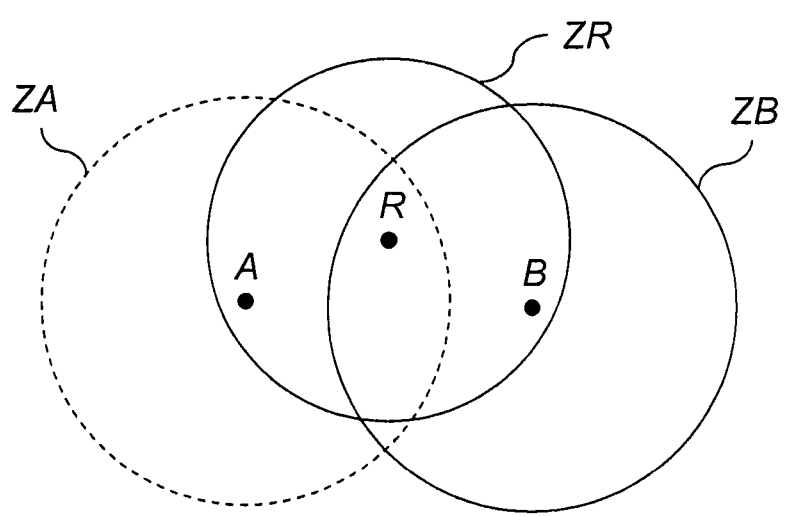
Figure 2A:
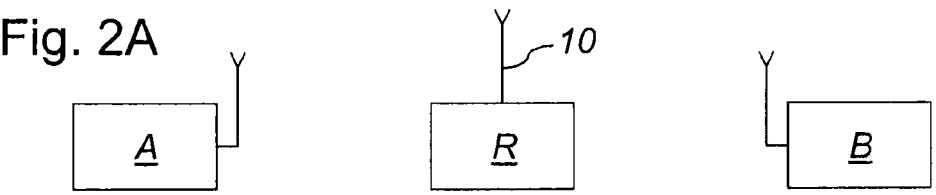
Figure 2B:
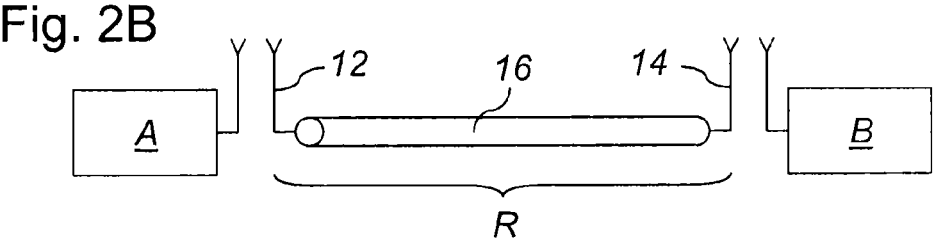
Figure 2C:
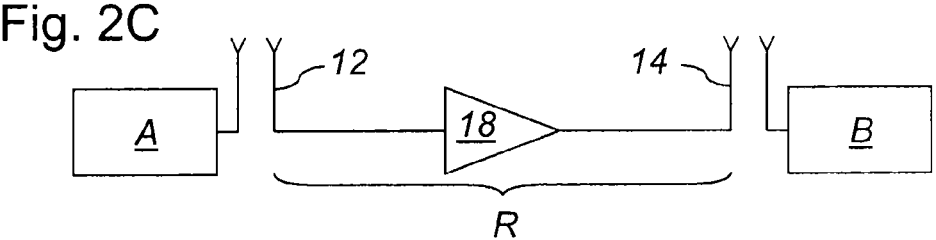
Figure 2D:
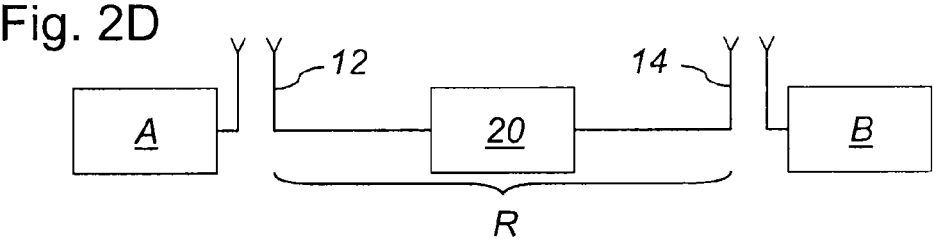
Figure 3:
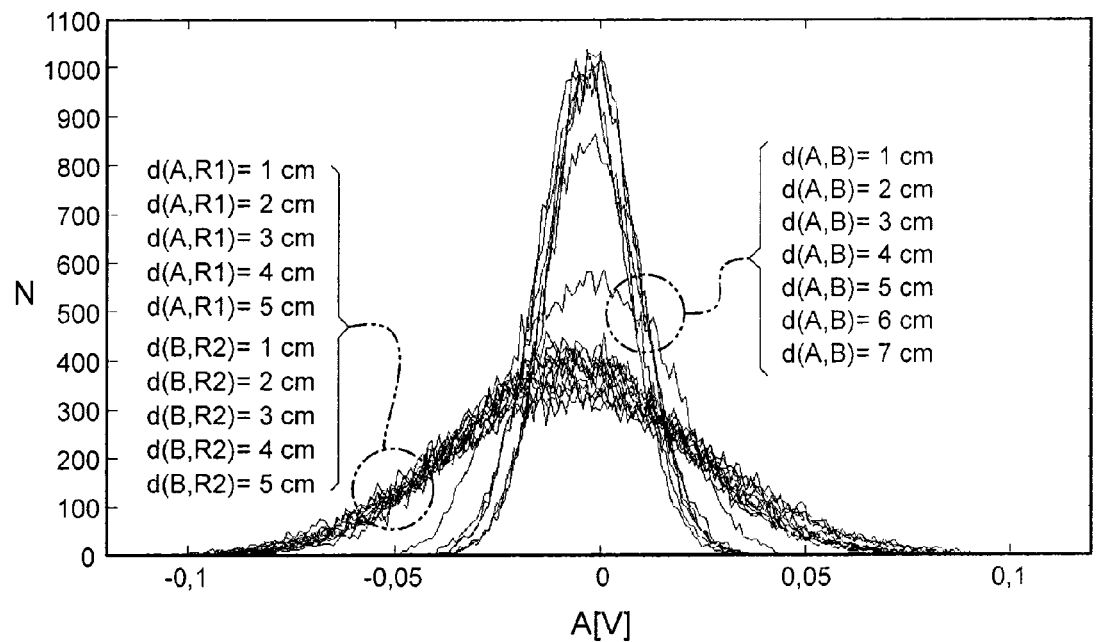
Figure 4:
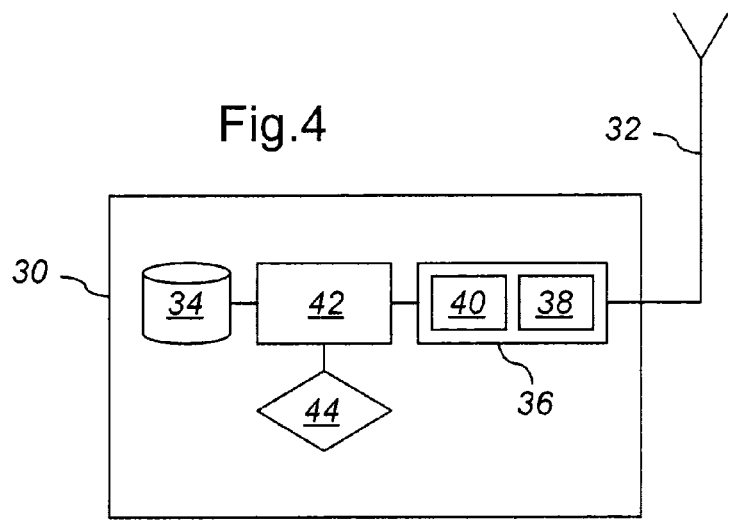
Figure 5:
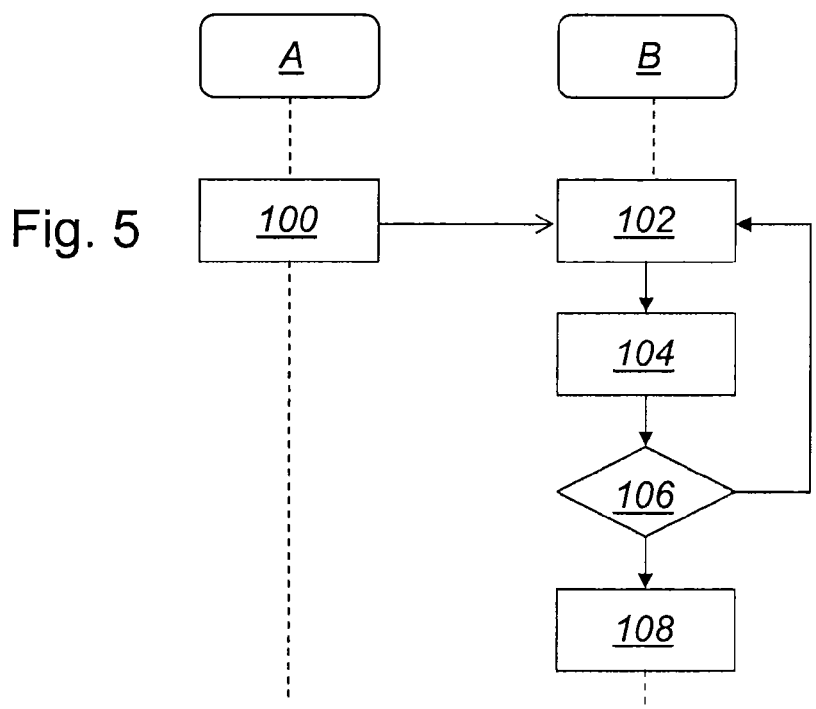
Figure 6:
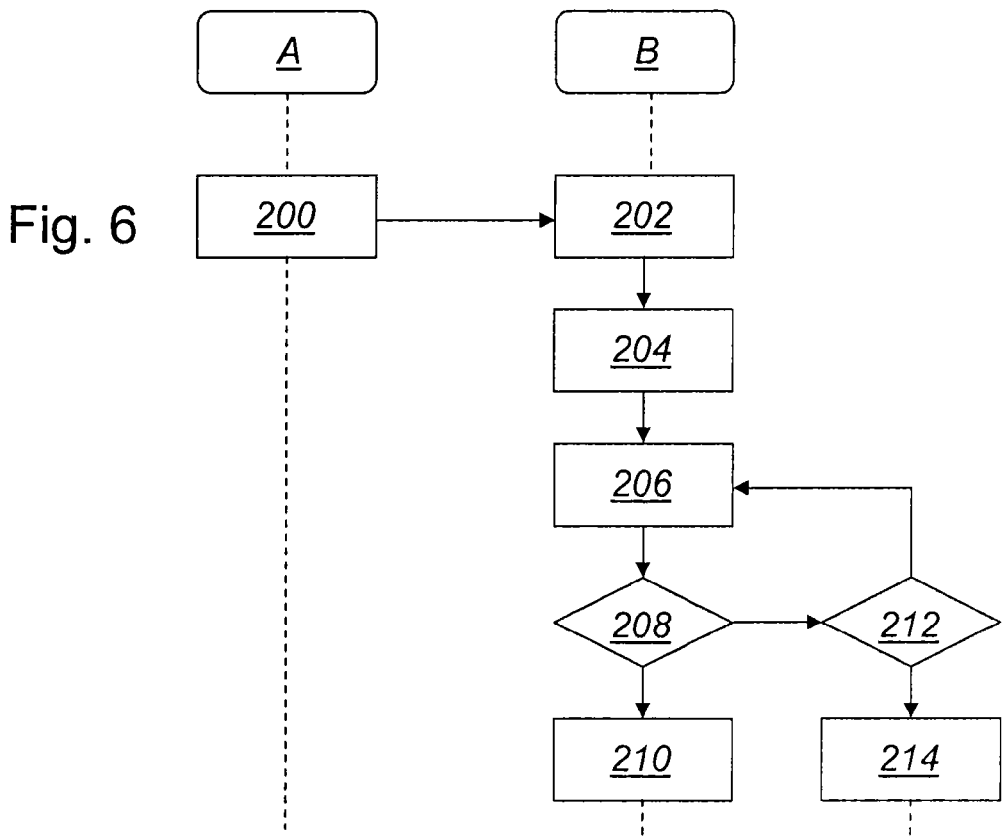

The invention will be better understood with the aid of the following description, provided solely as an example and with reference to the appended drawings, wherein:

FIGS. 1A and 1B schematically show the establishment of a communication between two wireless communication devices, without and with a relay device between them, FIGS. 2A, 2B, 2C and 2D show a plurality of relay attack scenarios possible between the two communication devices of FIGS. 1A and 1B, FIG. 3 is a diagram showing the effect of the presence or not of a relay device on the noise received by a communication device, FIG. 4 schematically shows the general structure of a receiver device according to an embodiment of the invention, FIG. 5 shows the successive steps of a calibration phase of a securing method according to an embodiment of the invention, and FIG. 6 shows the successive steps of a communication phase of a securing method according to an embodiment of the invention.

The wireless communication system shown in FIG. 1A comprises a transmitter device A and a receiver device B.

According to the type of communication envisaged (case 1, 2 or 3 mentioned above), the receiver device B may receive signals capable of being generated by A (case 1), reflected by A (case 2) or simply resulting from a simple presence of A in the magnetic field of B (case 3), when A is arranged inside a reception zone ZB of B located in a vicinity of B and containing B. Beyond this zone ZB, the device A is outside of the range of B and a contactless communication cannot be established between them. Thus, in the direct communication configuration of FIG. 1A, A is located inside this reception zone ZB.

It will be noted that in other wireless communication applications wherein the two devices A and B are both transmitters and receivers, A also has a reception zone ZA, represented with dotted lines in FIG. 1A, where B must also be located in order for a direct communication also to be capable of being established from B to A. In a direct communication situation, A and B are then both located inside the intersection of the reception zones ZA and ZB.

FIG. 1B shows a configuration of the communication system wherein the devices A and B cannot communicate directly since A is outside of the range of B. However, in this configuration, a relay device R is arranged between A and B so that an indirect communication can still take place between A and B. More specifically, the relay device R is arranged inside the reception zone ZB and it can itself receive signals capable of being transmitted by A, reflected by A or simply generated by a simple presence of A, when A is arranged inside a reception zone ZR of R located in the vicinity of R and containing R.

Thus, in a first possible type of indirect communication (case 1 mentioned above), a signal transmitted by device A may be received by the relay device R since A is located in the reception zone ZR of R, then retransmitted by the latter so as to be received by device B since R is located in the reception zone ZB of B.

In a second possible type of indirect communication (case 2 mentioned above), a signal transmitted by device B may be received by the relay device R when B is located in the reception zone ZR of R, then retransmitted by the latter so as to be reflected by device A and received by R since A is located in the reception zone ZR of R, then retransmitted by the latter so as to be received by device B since R is located in the reception zone ZB of B.

Finally, in a third possible type of indirect communication (case 3), the characteristics (power, modulation, optionally carrier frequency when it is not already known) of a magnetic field generated by the device B can be perceived by the relay device R when B is located in the reception zone ZR of R, then reproduced by the relay R for device A. As device A is located in the reception zone ZR of R, the signal transmitted by A, corresponding to the influence of A in the field of the relay R, may be retransmitted to B in the same way (inductive coupling) insofar as the relay R is located in the reception zone ZB of B.

It will be noted that, in other wireless communication applications wherein the two devices A and B are both transmitters and receivers, A also has a reception zone ZA, represented with dotted lines in FIG. 1B, where R must also be located in order for an indirect communication also to be capable of being established from B to A via the relay R. In an indirect communication situation, the relay device R is then located inside the intersection of the reception zones ZA and ZB.

When the devices A and B are even farther apart, in particular when their reception zones do not intersect, a plurality of relay devices may be necessary in order to establish an indirect communication between them.

Although, sometimes, one or more relay devices authorized and capable of being authenticated may be envisaged or tolerated between the communicating devices A and B, in the aforementioned example of a relay attack, a relay device may also be used fraudulently to intercept the data exchanged between A and B, identify one with respect to the other and/or cause them to believe that they are within the direct communication range of one another. It is therefore desirable to be able to easily and quickly detect the presence of a relay device. If a plurality of authorized relay devices are used, the initial transmitter plus all of the authorized relays may be seen as a single transmitter in the sense of this invention.

In the absence of a relay device R, if a signal transmitted by A according to one of the 3 cases mentioned above is denoted X, if the response of the transmission channel between A and B is denoted $H_{AB}$ and the signal directly received by B is denoted $Y_{AB}$, then the following relation is obtained:

$$Y_{AB}=H_{AB} \cdot X+N_B, \quad (1)$$

where $N_B$ is, for example, a Gaussian white noise received and capable of being measured by device B.

A plurality of types of relay devices, for a plurality of types of relay attacks, may be envisaged.

According to a first alternative of the simplest scenario of retransmission without amplification shown in FIG. 2A, the relay device R arranged between the transmitter device A and the receiver device B comprises a receiving and transmitting antenna 10. Owing to this antenna 10, it may receive a signal transmitted by device A and retransmit it without amplification to B. Reciprocally, in a two-way wireless communication, it may receive a signal transmitted by device B and retransmit it directly without amplification to A.

According to a second alternative of the simplest scenario of retransmission without amplification, shown in FIG. 2B, the relay device R comprises a first transmitting and receiving antenna 12, a second transmitting and receiving antenna 14 different from antenna 12 and a data transmission link 16 between the two antennas 12 and 14. The transmission link 16 is, for example, a traditional coaxial electrical cable, but, more generally, any wired or wireless data transmission link may be envisaged. This type of relay device may be used when devices A and B are too far apart to use only one relay device R according to FIG. 2A. The relay device R can thus receive a signal transmitted by device A, owing to antenna 12 and retransmit it without amplification to B owing to antenna 14 via the coaxial cable 16. Reciprocally, it is possible to receive a signal transmitted by device B owing to antenna 14 and to retransmit it without amplification to A owing to antenna 12 via the coaxial cable 16.

In practice, the aforementioned antennas 10, 12, 14 may be MIMO (Multiple Input Multiple Output) antennas, SISO (Single Input Single Output) antennas, SIMO (Single Input Multiple Output) antennas or MISO (Multiple Input Single Output) antennas.

According to this scenario of retransmission without amplification by the relay device R, the signal indirectly received by B, denoted $Y_{ARB}$, becomes:

$$Y_{ARB} = H_{RB} \cdot (H_{AR} \cdot X + N_R) + N_B \qquad (2)$$
$$= H_{RB} \cdot H_{AR} \cdot X + H_{RB} \cdot N_R + N_B,$$

where $N_R$ is, for example, a Gaussian white noise received by the relay device R, $H_{AR}$ the response of the transmission channel between A and R and $H_{RB}$ the response of the transmission channel between R and B.

Equations (1) and (2) show a difference between the amounts of noise received by device B with or without a relay device R. It is noted in particular that, in direct reception, according to equation (1), the noise, separable from the useful signal, received by B is $N_B$, while in indirect reception and according to the scenario of retransmission without amplification, according to equation (2), the noise, separable from the useful signal, received by B is $H_{RB} \cdot N_R + N_B$. This property is advantageously exploited by the invention, as described in detail in reference to FIGS. 4 to 6.

According to a scenario slightly more complex than the previous one of retransmission with amplification shown in FIG. 2C, the relay device R comprises a first transmitting and receiving antenna 12, a second transmitting and receiving antenna 14 different from antenna 12 and a link for signal transmission between the two antennas 12 and 14 comprising an amplifier 18. The relay device R can thus receive a signal transmitted by device A, owing to antenna 12 and retransmit it directly with amplification to B owing to antenna 14. Reciprocally, it can receive a signal transmitted by device B owing to antenna 14 and retransmit it with amplification to A owing to antenna 12.

According to this scenario of retransmission with amplification by the relay device R, the signal $Y_{ARB}$ indirectly received by B becomes:

$$Y_{ARB} = G \cdot H_{RB} \cdot (H_{AR} \cdot X + N_R) + N_B \qquad (3)$$
$$= G \cdot H_{RB} \cdot H_{AR} \cdot X + G \cdot H_{RB} \cdot N_R + N_B,$$

where G is the gain of the amplifier 18.

Equations (1) and (3) again show a difference between the amounts of noise received by device B with or without a relay device R. It is noted in particular that in direct reception, according to equation (1), the noise, separable from the useful signal, received by B is $N_B$, while in indirect reception and according to the scenario of retransmission with amplification, according to equation (3), the noise, separable from the useful signal, received by B is $G \cdot H_{RB} \cdot N_R + N_B$. This property is advantageously exploited by the invention, as will de described in detail in reference to FIGS. 4 to 6.

According to another retransmission scenario with decoding and recoding shown in FIG. 2D, the relay device R comprises a first transmitting and receiving antenna 12, a second transmitting and receiving antenna 14 different from antenna 12 and a link for data transmission between the two antennas 12 and 14 comprising a coder/decoder 20. The relay device R can thus receive a signal transmitted by device A, owing to antenna 12, decode it and recode it owing to the coder/decoder 20 and retransmit it to B owing to antenna 14. Reciprocally, it can receive a signal transmitted by device B owing to antenna 14, decode it and recode it owing to the coder/decoder 20 and retransmit it to A owing to antenna 12.

According to this scenario of retransmission with decoding and recoding by the relay device R, the signal $Y_{ARB}$ indirectly received by B becomes:

$$Y_{ARB} = H_{RB} \cdot X' + N_B, \qquad (4)$$

where X' is the signal obtained by the relay device R after decoding and recoding.

Equations (1) and (4) this time show that the amounts of noise received by device B with or without a relay device R are a priori the same.

To detect this type of relay device with decoding and recoding, it may thus be advantageous to voluntarily add a predetermined noise $N_C$ to the transmission, this predetermined noise and/or parameters making it possible to generate this predetermined noise being known to the transmitter device and the receiver device but not the relay device R.

The equation (1) then becomes:

$$Y_{AB} = H_{AB} \cdot X + N_B + N_C, \qquad (5)$$

Equations (5) and (4) again show a difference between the amounts of noise received by device B with or without a relay device R. It is noted in particular that, in direct reception, according to equation (5), the noise, separable from the useful signal, received by B is $N_B$ $N_C$, while in indirect reception and according to the scenario of retransmission with decoding and recoding, according to equation (4), the noise, separable from the useful signal, received by B is $N_B$. This property is advantageously exploited by an embodiment of the invention as will be described in detail in reference to FIGS. 4 to 6.

The diagram shown in FIG. 3 results from experimental measurements of a receiver device, for example device B, in order to determine the noise distribution (measured in Volts on an oscilloscope) on a certain number of samples, according to different distance configurations d(A,B) between the communicating devices A and B without relay R and according to different distance configurations d(A,R1) between A and R1 and d(B,R2) between R2 and B with relay R, wherein R1 designates an antenna of R arranged near transmitter A and R2 is an antenna of R arranged near receiver B (according to one of the first and second scenarios presented above).

The experimental conditions are as follows: the communication is contactless in the near field, and the signals exchanged comply with ISO standard 14443-A. The receiver device B is a classic contactless reader and the transmitter device A is a traditional contactless card-type transponder. The signal received by the receiver B and modulated by the transmitter A is centred on the frequency 13.56 MHz (carrier of the reader/receiver) and has a bandwidth of around 2 MHz (modulation of the transponder/transmitter). To extract the noise received, a band-stop filter is applied, for example, having cut-off frequencies of 9 MHz and 18 MHz, so that the filtered signal received by B can be considered to comprise only the frequencies linked to the noise.

In the direct communication configuration without relay between A and B, and regardless of the distance d(A,B) between A and B of 1 to 7 cm, it is noted that the noise distribution is very dense in the vicinity of 0 and remains fairly constant. In the indirect communication configuration with relay between A and B, regardless of the distance d(A, R1) between A and R1 of 1 to 5 cm and regardless of the distance d(B,R2) between B and R2 of 1 to 5 cm, it is noted that the noise distribution is clearly less dense in the vicinity of 0 and remains fairly constant. It therefore appears that the measurements establish that the statistical, spectral and/or amplitude properties of the filtered noise signal differ depending on whether the wireless communication between A and B is with or without relay operating according to one of the first and second scenarios presented above. These measurements confirm the expected results of equations (1) to (3).

A receiver device 30 according to the invention therefore advantageously comprises, as shown in FIG. 4:

a signal receiving antenna 32,
- a memory 34 for storing at least one reference noise parameter characteristic of a direct communication without a relay device between a predetermined transmitter device and the receiver device 30,
- means 36 for extracting at least one noise parameter from a signal received and transmitted by the antenna 32, these extraction means 36 comprising, for example, a band-stop filter 38 and means 40 for estimating at least one statistical, spectral and/or amplitude parameter of the filtered noise signal,
- means 42 for comparing the extracted noise parameter with the reference noise parameter, and
- means 44 for detecting the presence or the absence of a relay device between the predetermined transmitter device and the receiver device 30 according to the result of this comparison.

In practice, the estimation 40, comparison 42 and detection 44 means may be implemented in the form of at least one electronic microprocessor chip and/or programmed in the form of instructions of at least one computer program stored in the receiver device 30.

Optionally, to be capable of detecting the presence of a relay device with decoding and recoding of the signals retransmitted, the memory 34 can further store at least one predetermined noise parameter also known to the predetermined transmitter device. In this case, the comparison means 42 are designed to take into account this predetermined noise parameter.

In an embodiment as shown in FIG. 1A or 1B, where only device B is necessarily a receiver, the latter may have a general structure conforming to that of the receiver device 30 of FIG. 4. In particular, it will be noted that, in a near-field contactless communication application with a passive card and a card reader, it is enough for the card reader, both transmitter (by generating a local magnetic field) and receiver (by detecting modulations generated on this magnetic field by the card identifier), to conform to the receiver device 30 with adaptation of the antenna 32 to this specific application in order for the invention to be capable of being implemented.

In other possible embodiments, wherein each wireless communicating device A or B of the communication system is both the transmitter and the receiver, devices A and B may each have a general structure conforming to that of the receiver device 30 of FIG. 4.

The operation of a receiver device such as that of FIG. 4 will now be described in detail in reference to FIGS. 5 and 6.

In a calibration phase of the receiver device B shown in FIG. 5, during which it is ensured that a communication without a relay device can take place between devices A and B, the transmitter device A first sends a useful signal S to device B (step 100).

This signal S is received by device B in a step 102.

Then, in an analysis step 104, the receiver device B extracts noise parameters. For example, it filters the signal received, in particular by means of the band-stop filter 38 if such a filter is implemented, in order to provide a noise signal and, in a traditional manner, extracts statistical, spectral and/or amplitude parameters using means 40. These means 40 are, for example, traditional software means for characterizing a noise by means of statistical methods, characterizations of frequency or temporal responses, in order to identify a noise and then be capable of comparing it to other noises. It is possible, for example, to cite the methods for correlation of signals, analysis of the amplitude of a signal with respect to a fixed threshold, estimation of a signal-to-noise ratio, spectral or statistical analysis (variance, mean, . . . ) of signals. It will also be noted that it is possible to extract noise parameters from a noisy signal without necessarily filtering the noisy signal first, which may substantially simplify the implementation of the extraction means 36.

The computation of noise parameters is, for example, repeated N times, with N being capable of being high, in order to improve the characterization of the reference noise signal, i.e. the noise signal normally received by device B in the absence of a relay device R. This repetition is ensured by the execution of a test step 106 requiring device B to return to step 102 insofar as the number N of iterations is not reached.

Finally, when the N reference noise characterizations are produced, the resulting parameters are stored in the memory 34 in a step 108. It is thus possible to construct a noise base collecting different noise measurements that may then be used to detect relay devices. It will also be noted that these different characterizations may be produced under different conditions, thus forming a database containing a plurality of noise estimations. In a contactless communication application, these different conditions may, for example, be different authorized cases wherein a plurality of transponders are present in the reception zone of the reader/receiver device.

By reciprocity, and optionally, in a two-way communication application, device A may also, as a potential receiver of B, execute the steps of this calibration phase by means of B without a relay device.

The calibration phase described above must be performed during a communication without relay between devices A and B. It may, for example, be executed when there is no exchange of frames between the two devices A and B, for example before the deployment of the network in a traditional wireless telecommunication application.

A communication phase, with or without a relay device, is shown in FIG. 6. The communication is established between the communicating devices A and B, with these two devices assuming a priori that the exchange is direct without retransmission by relay.

In a first step 200, device A sends a useful signal to device B. Optionally, and to counter retransmission relay attacks with decoding and recoding, in this step 200, device A generates a predetermined noise signal on the basis of at least one predetermined noise parameter also known to device B and adds this noise signal to the useful signal before sending it to device B.

The signal sent by A is received by device B in a step 202.

Then, in an analysis step 204, the device B extracts noise parameters. For example, it filters the signal received, in particular by means of the band-stop filter 38 if it is implemented, in order to provide a noise signal and, in a traditional manner, extract the statistical, spectral and/or amplitude parameters therefore using means 40, in the same way as in the calibration phase.

In a step 206, the receiver device B compares the extracted noise parameter(s) with the corresponding reference noise parameter(s) stored in the memory. Of course, if the useful signal has been transmitted with the predetermined noise known to B, the comparison, by the receiver device B, of the extracted noise parameter(s) with the reference noise parameter(s) involves taking into account the predetermined noise parameter(s) known to B.

Then, during a test step 208, the receiver device B tests, according to the previous comparison result, whether the parameters compared should be considered to be identical or different.

If the parameters compared are considered to be different, i.e. if it may be considered that there is a variation in noise characteristics with respect to the calibration phase, then a step 210 of making a positive decision concluding the presence of a relay device R between the two communicating devices A and B is performed. If not, a step 212 is performed.

If it is considered that a single comparison resulting in an identity between the parameters compared is not sufficient to conclude the absence of a relay device between the two communicating devices A and B, but that x comparisons leading to the same result must successively be performed, step 212 consists of requiring step 206 to be repeated insofar as the number x of comparisons has not been reached.

Finally, when the number x of comparisons all resulting in an identity between the compared parameters is reached, a step 214 of making a negative decision concluding the absence of a relay device R between the two communicating devices A and B is performed.

This requirement of x comparisons all resulting in an identity between the parameters compared in order to make a negative decision while a single comparison resulting in a difference in the parameters compared is enough to make a positive decision is intended to limit the risk of "false negatives", i.e. negative decisions made (decisions concluding the absence of relays) even though a relay device R is indeed present between A and B. Indeed, a "false positive", i.e. a positive decision made (decisions concluding the presence of relays) even though no relay device R is present between A and B, has fewer consequences than a false negative. In other words, the addition of comparisons makes it possible to reinforce security.

Optionally, the number x of comparisons to be made before going on to the negative decision step 214 may be dependent on the number N of reference noise characterizations produced in the calibration phase.

Another complementary way in which to reduce the risk of false positives and negatives consists of providing, during the test step 208, a hypothesis test enabling the receiver device B to fix hypothesis rejection thresholds (hypothesis on the absence or presence of a relay device), using, for example, the test known to a person skilled in the art called the Fisher test, or based on the probabilities of false positives and negatives targeted. The Fisher test is in particular described in detail in the document of M. G. Kendall, A. Stuart, J. K. Ord, entitled "Kendall's advanced theory of statistics", Hodder Arnold Publication, June 1994.

As a simple and concrete example, purely illustrative and non-limiting, the detection may be based on the analysis of a variance parameter of the noise received by the receiver device B. The reference noise parameter is then a variance value $\sigma_0^2$ calculated during the calibration phase. A statistic $S^2$ for estimating the variance $\sigma^2$ of the noise filtered in step 204 obtained on n samples may be used:

$$S^2 = \sum_{i=1}^{n} \frac{(X_i - \overline{X})^2}{n-1}.$$

Assuming that the noise is white, Gaussian and with a zero mean, the test statistic $S^2$ is a random variable of $\chi^2$ with a degree of freedom n−1 verifying the following approximation:

$$\frac{(n-1)S^2}{\sigma^2} \approx \chi_{(n-1)}^2.$$

Thus, a decision rule may consist of:
Si $S^2 \in [a,b]$, then the absence of a relay is concluded, and
Si $S^2 \notin [a,b]$, then the presence of a relay is concluded,
wherein the parameters a and b are determined according to the targeted critical probability α of false positives and negatives.

More specifically:

$$\alpha = P[S^2 \notin [a, b], \text{ when } \sigma^2 = \sigma_0^2],$$
$$= P\left[\frac{(n-1)S^2}{\sigma_0^2} \notin \left[\frac{(n-1)a}{\sigma_0^2}, \frac{(n-1)b}{\sigma_0^2}\right]\right],$$
$$= P\left[\chi_{(n-1)}^2 \notin \left[\frac{(n-1)a}{\sigma_0^2}, \frac{(n-1)b}{\sigma_0^2}\right]\right].$$

The terminals of this interval may be obtained on the basis of the following equations:

$$\frac{\alpha}{2} = P\left[\chi_{(n-1)}^2 < \frac{(n-1)a}{\sigma_0^2}\right]$$

and $$\frac{\alpha}{2} = P\left[\chi_{(n-1)}^2 > \frac{(n-1)b}{\sigma_0^2}\right].$$

Indeed, as variable α is set a priori, it is simple to deduce the values of a and b therefrom.

Consequently, the principle of the test performed in step 208 may, in this simple example, comprise the following steps:
- determination of $S^2$ on n samples,
- comparison of the value obtained with the interval [a,b],
- conclusions on the identity or the difference of the parameters compared.

By reciprocity and optionally, in a two-way communication application, device A may also, as a receiver of B, execute the same steps 202 to 214 of this communication phase.

It clearly appears that a method for securing a wireless communication such as that described above is simple to implement and therefore economical in terms of implementation costs in a communication system. In particular, it does not require any particular technical addition, such as a directional antenna or the use of mutually synchronized clocks, on the transmission/reception devices involved. Moreover, it does not require the use of cryptographic protocols for its implementation.

It is not dependent on a standard or a high-level protocol since it takes advantage of the characteristics of transmitted signals capable of being extracted at the physical layer of the OSI model. It is thus suitable for any type of wireless or contactless network: traditional mobile telephone wireless networks, ad hoc wireless networks, sensor networks, contactless RFID or NFC systems, vehicular networks, etc.

Finally, it can easily be adjusted for each application that may be envisaged, whether military, surveillance, authentication or other.

It will moreover be noted that the invention is not limited to the embodiments described above. It will indeed appear to a person skilled in the art that various modifications may be made to the embodiments described above, in light of the teaching just disclosed. In the claims below, the terms used must not be interpreted as limiting the claims to the embodiments disclosed in the present description, but must be interpreted as including all equivalents that the claims are intended to cover by their wording and which can be envisaged by a person skilled in the art applying his or her general knowledge to the embodiment of the teaching just disclosed.

The invention claimed is:

1. A method for securing a wireless communication between a transmitter device and a receiver device, comprising:
   reception of a signal by the receiver device;
   extraction by the receiver device of at least one noise parameter of this signal received;
   comparison of the extracted noise parameter with at least one corresponding reference noise parameter stored in a memory in the receiver device;
   decision on the presence or the absence of a relay device between the transmitter device and the receiver device according to the result of this comparison;
   a preliminary calibration of the receiver device, wherein:
      the receiver device receives a signal resulting from a direct communication with the transmitter device without intervention of a relay device;
      the receiver device extracts at least one noise parameter from the signal received; and
      the receiver device stores this noise parameter in the memory, as a reference noise parameter characteristic of a direct communication without a relay device between the transmitter device and the receiver device.

2. The method for securing a wireless communication according to claim 1, first comprising:
   generation, by the transmitter device, of a predetermined noise based on at least one predetermined noise parameter known to the transmitter device and the receiver device, and
   transmission of a signal comprising the predetermined noise,
   wherein the comparison, by the receiver device, of the extracted noise parameter with the reference noise parameter comprises consideration of the predetermined noise parameter known to the transmitter device and the receiver device.

3. The method for securing a wireless communication according to claim 1, wherein the extracted noise parameter and the reference noise parameter each comprise a noise variance estimation parameter.

4. The method for securing a wireless communication according to claim 1, wherein the decision about the presence or the absence of a relay device comprises a test of a hypothesis of the presence or absence of a relay device checked against rejection thresholds of this hypothesis computed according to a Fisher test or predetermined probabilities of false positives and/or negatives targeted.

5. A receiver device for receiving signals generated by a wireless communication between a predetermined transmitter device and this receiver device, comprising:
   means for calibration by reception of a signal resulting from a direct communication with the transmitter device without intervention of a relay device and by extraction of at least one noise parameter from the signal received as a reference noise parameter characteristic of a direct communication without a relay device between the transmitter device and the receiver device;
   means for storing this reference noise parameter;
   means for extracting at least one noise parameter from a signal received;
   means for comparing the extracted noise parameter with the reference noise parameter; and
   means for detecting the presence or the absence of a relay device between the predetermined transmitter device and the receiver device according to the result of this comparison.

6. The receiver device according to claim 5, further comprising means for storing at least one predetermined noise parameter also known to the predetermined transmitter device, and wherein the comparison means is configured to take this predetermined noise parameter into account.

7. The receiver device according to claim 5, wherein the extraction means comprises:
   a band-stop filter configured to be applied to the signal received to provide a filtered noise signal and of which cut-off frequencies are defined according to an assumed useful bandwidth of the signal received; and
   means for estimating at least one statistical, spectral, and/or amplitude parameter of the filtered noise signal.

8. A secure wireless communication system comprising at least one receiver device and at least one transmitter device, wherein each receiver device is a device according to claim 5.

9. The secure wireless communication system according to claim 8, wherein each transmitter device or receiver device, respectively, is also a receiver device or a transmitter device, respectively.

* * * * *